United States Patent [19]

Edwards, Jr.

[11] 4,409,817
[45] Oct. 18, 1983

[54] VACUUM LEAK DETECTOR AND METHOD

[76] Inventor: David Edwards, Jr., 7 Brown's La., Bellport, N.Y. 11713

[21] Appl. No.: 247,613

[22] Filed: Mar. 25, 1981

[51] Int. Cl.³ .............................................. G01M 3/20
[52] U.S. Cl. ................................................... 73/40.7
[58] Field of Search ......................... 73/40.7, 40, 49.2

[56] References Cited

U.S. PATENT DOCUMENTS

| | | | |
|---|---|---|---|
| 2,863,315 | 12/1958 | Penning | 73/40.7 |
| 3,416,359 | 12/1968 | Durbin et al. | 73/40.7 |
| 3,592,048 | 7/1971 | Maurice et al. | 73/40.7 |
| 3,798,536 | 3/1974 | Maillard et al. | 73/40.7 X |
| 3,855,844 | 12/1974 | Craig | 73/40.7 |
| 4,172,477 | 10/1979 | Reich | 73/49.2 X |
| 4,232,546 | 11/1980 | Dumont | 73/40.7 |
| 4,320,653 | 3/1982 | Bernhardt | 73/40 |

Primary Examiner—Steven L. Stephan
Assistant Examiner—Joseph W. Roskos
Attorney, Agent, or Firm—Paul W. Garbo

[57] ABSTRACT

Apparatus and method for detecting leakage in a vacuum system involves a moisture trap chamber connected to the vacuum system and to a pressure gauge. Moisture in the trap chamber is captured by freezing or by a moisture adsorbent to reduce the residual water vapor pressure therein to a negligible amount. The pressure gauge is then read to determine whether the vacuum system is leaky. By directing a stream of carbon dioxide or helium at potentially leaky parts of the vacuum system, the apparatus can be used with supplemental means to locate leaks.

19 Claims, 5 Drawing Figures

VACUUM LEAK DETECTOR AND METHOD

BACKGROUND OF THE INVENTION

This invention was made under, or during the course of, a contract with the U.S. Department of Energy.

This invention relates to leak detection in high vacuum systems, particularly in complex or extended high vacuum systems having parts that are not easily accessible.

A reliable indication of the presence of a leak or leaks in a high vacuum system is the presence of air in the system after pumpdown. Although several techniques exist for testing for the presence of air in high vacuum systems such as mass spectrometer and cold cathode discharge gauge, they are not only costly but also not suited for detecting leaks in systems maintained at any low pressure below about 1000 microns (0.001 millimeter) of Hg (mercury) and particularly below about 400 microns of Hg. At such very low pressures the moisture on the inner surfaces of the system may give a pressure reading that is a false indication of a leak in the system. Hence, it is important to determine whether the pressure reading after pumpdown is produced by substantially only water vapor from the system or by both water vapor and air inasmuch as the presence of air is the sole indicator and proof of a leak in the system.

Accordingly, it is an object of this invention to provide apparatus and method which are simple and reliable for the detection of leaks in high vacuum systems.

A further object is to provide such apparatus and method which do not require a specially trained operator.

Still another object is to provide apparatus and method for locating any leak in a vacuum system.

Additional objects are to provide an inexpensive apparatus and a rapid method of detecting leaks in high vacuum systems.

These and other objects and advantages of the invention will be apparent from the description which follows.

SUMMARY OF THE INVENTION

In accordance with this invention, the leak detection apparatus for a high vacuum system comprises a water or moisture trap, which is connected by a valved passage with the vacuum system and is capable of capturing water vapor entering the trap so that the water vapor pressure in the trap is reduced to a negligible level, say below about 2 microns of Hg, preferably about 0.1 micron of Hg, and a sensitive low pressure gauge connected to the water trap so that it reads the pressure in the trap.

A simple and advantageous form of water trap is a U-tube with one arm connected by a valved tube to the vacuum system and the other arm connected to the sensitive pressure gauge such as a thermocouple-type pressure gauge. However, any chamber or vessel with connections to the vacuum system and the pressure gauge may be used.

As already mentioned, it is important to determine whether the pressure reading of an evacuated system is the result of substantially only water vapor in the system or of both water vapor and air because air is the true indicator of any leakage in the system. It is for this reason that the moisture trap should be capable of freezing or adsorbing moisture to such an extent that the residual water vapor pressure in the trap is negligible, say below about 2 microns of Hg. However, when moisture is captured by freezing, the temperature should not be so low that any part of the air (oxygen, nitrogen) is condensed or even adsorbed by the ice in the trap. It has been determined that to reduce the water vapor pressure in the trap to a negligible level and still prevent any significant capture of any part or component of air the trap should be chilled to a temperature in the range of about −120° to −40° C. (centigrade). Preferably the temperature should be in the range of about −90° to −60° C.

A simple and desirable way of chilling the trap to a temperature in the preferred range is to immerse the trap in a suspension of solid carbon dioxide in an organic liquid such as methanol, denatured alcohol, acetone, ether, chloroform or carbon disulfide. The trap may also be chilled by contact with a liquefied gas such as ethane, propane or hydrogen chloride, or with a cooling bath made up of snow and inorganic compounds such as calcium chloride, zinc chloride, ferric chloride, nitric acid, hydrochloric acid and potassium hydroxide. Any known refrigeration system may be used for attaining the desired low temperature in the trap but is rarely justified in preference to a simple and inexpensive cooling bath of the type already described.

Alternatively, moisture may be removed from any air flowing into the trap by an adsorbent which herein is used broadly to mean any liquid or solid agent that binds water to itself by chemical and/or physical action. As in the case of removing moisture by freezing, the selected adsorbent used in the trap should be capable of reducing the water vapor pressure therein to a negligible value below about 2 microns of Hg. Illustrative drying agents generally considered chemical reagents are phosphorus pentoxide, fused potassium hydroxide and sulfuric acid, while activated alumina, silica gel and molecular sieves, such as synthetic crystalline metal alumino-silicates are representative agents which dehydrate essentially by physical affinity. If the selected adsorbent is not able to lower the water vapor pressure in the trap to at least about 2 microns of Hg some cooling of the trap, say to about 0° C., may be used to attain a negligible water vapor pressure therein.

The method of leak detection in a high vacuum system can be carried out in accordance with this invention intermittently or continuously. In either case, the system may be evacuated while the trap is at ambient temperature and in fluid communication with the system. After pumpdown or evacuation of the system produces a substantially steady or constant reading at the pressure gauge of the leak detection apparatus, it is advisable particularly at the start-up of the vacuum system to complete the leak detection method on the intermittent or static basis. Thus, to complete the static method, the valve in the tube connecting the trap to the system is closed. If a moisture adsorbent is not used, the trap is then chilled to reduce the water vapor pressure therein to below about 2 microns of Hg. Any resulting reduction in the pressure reading is indicative of water vapor in the system that contributed to the pressure reading before the trap was chilled. Any residual pressure reading after the trap has been chilled is indicative of air in the evacuated system coming from one or more leaks in the system. When an adsorbent is used, the valve between the evacuated system and trap is closed to note any drop in the reading of the pressure gauge. Most of the moisture flowing to the trap during pumpdown has already been captured but after closing the valve a slight diminution of the pressure reading may occur, particularly with an adsorbent that has a slow rate of moisture adsorption. Of course, the final reading of the pressure gauge will be that of air and will indicate whether or not the system has any leakage.

Without a moisture adsorbent, the continuous or dynamic form of the leak detection method differs from the static method just described in that, when a substantially constant pressure reading has been attained in the evacuated system, the valve in the connection to the trap is left open and the trap is chilled as described for the static method. Again, the reduction of the pressure reading resulting from the deposition of ice in the cold trap is a measure of the water vapor in the evacuated system while the residual pressure reading is indicative of air in the system. If the reduction in the pressure reading which corresponds to the water vapor pressure in the evacuated system is greater than about 100 microns of Hg, the residual pressure reading will tend to creep upward and thus give an unreliable measure of air in the evacuated system. This tendency is believed to be caused by the continuous flow of water vapor from the system into the cold trap. Inasmuch as air in the system will be carried by the water vapor to the cold trap, air accumulates in the trap because its migration back into the system is impeded by the flow of water vapor into the cold trap. The build-up of air in the trap thus gives a pressure reading that is higher than it should be.

Hence, when the water vapor pressure in an evacuated system exceeds about 100 microns of Hg, the static form of the leak detection method should be used to make a reliable determination of any leakage in the evacuated system. At water vapor pressure below about 100 microns of Hg, the entrainment of any air in the system by the water vapor flowing into the trap is insignificant and therefore the dynamic form of the leakage detection method will give substantially the same reliable pressure reading for the presence of any air in the system as will be obtained with the static form of the method. Accordingly, while the static form of the method of the invention can be practiced to achieve a reliable indication of any leakage in an evacuated system at all levels of water vapor pressure in that system, it is advisable that the dynamic form be performed only when the water vapor pressure in the system is below about 100 microns of Hg. When moisture is captured in the trap with an adsorbent, there is little difference between the dynamic and static forms of the method as already mentioned. If the water vapor pressure is more than about 100 microns of Hg in the evacuated system, there may be a higher reading of the pressure gauge than it should be because of the entrainment of air into the trap by the flow of water vapor.

The static form of leak detection in a vacuum system is advisable and preferable in the period following pumpdown of the system. After the evacuated system has been found free of leakage, it is preferred to use the dynamic form of the method so as to monitor the vacuum system continuously for any leakage which may develop during an extended period of operation of that system.

The apparatus of this invention can be further used to locate any leak in a vacuum system after the existence of leakage has been established. It has been mentioned hereinbefore that moisture captured by freezing in the trap should not be so cold that any part of the leakage air is adsorbed by the ice in the trap. The adsorption or capture of non-condensables such as nitrogen by water deposited at very low temperatures is known as the cryotrapping process and is discussed in The Physical Basis of Ultrahigh Vacuum, published 1968 by Chapman and Hall, Ltd, starting on page 83.

After the existence of leakage in a vacuum system has been determined, the invention can be further used to locate the leak or leaks in that system by utilizing the cryotrapping process. More specifically, moisture deposited in the trap at a very low temperature such as the temperature of liquid nitrogen is employed to capture air that has leaked into the evacuated system and a stream of helium is directed at places on the exterior of the system, such as pipe connections, valves and welds, which are possible sources of leaks. Inasmuch as leakage air will be cryotrapped by the ice in the trap, the pressure gauge will give a very low reading but when helium is directed at a leak site, the gauge will give an increased pressure reading because helium sucked into the evacuated system and trap is not cryotrapped. Thus, the location of the leak is established. This procedure of using helium as a probe gas to locate leaks in a vacuum system is preferred for locating very small leaks, i.e., less than about $10^{-7}$ milliliter of air per second.

Except for very small leaks, the preferred procedure for locating leaks involves chilling the trap to a low temperature, such as $-195°$ C., capable of causing carbon dioxide gas to condense therein and spraying carbon dioxide from a fire extinguisher or the like at places on the exterior of the vacuum system that are potential sources of leakage. When carbon dioxide hits a leak site, it flows into the vacuum system and displaces the air therein as well as in the trap. Inasmuch as the carbon dioxide entering the trap is condensed therein, the pressure gauge on the trap shows a decreased reading thus signaling that a leak has been found. Of course, when the spraying of carbon dioxide on the leak is stopped, air again enters the system and trap so that the gauge shows an increased pressure reading. Thus, the location of the leak is confirmed.

If the pressure gauge on the trap gives a reading in excess of about 100 microns of Hg, air in the trap cannot migrate out of the trap against the flow of carbon dioxide into the trap from the system which it enters when carbon dioxide is sprayed on a leak. While air cannot leave the trap, the pressure therein will remain substantially unchanged because the carbon dioxide entering the very cold trap is immediately condensed. Obviously, without any fluctuation in pressure, the location of a leak cannot be established.

However, in a leaky vacuum system having a pressure in excess of about 100 microns of Hg, the location of leakage can still be accomplished with carbon dioxide by simply connecting a small vacuum pump directly to the cold trap. Air in the trap is removed by this additional vacuum pump but leakage air in the system flows into the trap faster than it is purged therefrom. Hence, the pressure gauge on the trap shows a substantially unchanged reading. But when a jet of carbon dioxide impinges on a leak in the vacuum system, it flows into the system and from there into the trap. With the added vacuum pump removing air from the trap and with carbon dioxide flowing from the system into the trap, the pressure gauge shows a decreased reading because the carbon dioxide is condensed upon entering the cold trap. By stopping the carbon dioxide jet on the thus found leak, air will again enter the system and trap. Inasmuch as the small pump cannot purge air from the trap as rapidly as leakage air enters the trap, the pressure gauge shows an increased reading and thus confirms that the leak was correctly located by the carbon dioxide jet when the pressure in the trap dropped.

When an adsorbent is used in the trap to capture moisture instead of chilling the trap, the trap containing adsorbent can also be further used to locate the leak or leaks in an evacuated system after it has been found that the system suffers from air leakage. Assuming that the trap contains a granular adsorbent such as activated carbon or a molecular sieve, the trap is chilled by contacting the exterior surface thereof with liquid nitrogen so that leakage air flowing from the evacuated system into the trap is, like moisture, captured by the chilled adsorbent. Hence, the reading of the pressure gauge on the trap drops. Thereupon, a stream of helium is directed in succession at various parts of the vacuum system suspected as possible sites of leakage until the pressure gauge shows an increased reading caused by the helium drawn into the system at a leakage site. Inasmuch as the helium flowing into the trap is not captured by the chilled adsorbent, the reading of the pressure gauge rises and this signals the location of a leak.

BRIEF DESCRIPTION OF THE DRAWINGS

Further clarification of the invention will become apparent from the following description which is presented in relation to the accompanying drawings of which.

DESCRIPTION OF PREFERRED EMBODIMENTS

Figure 1:
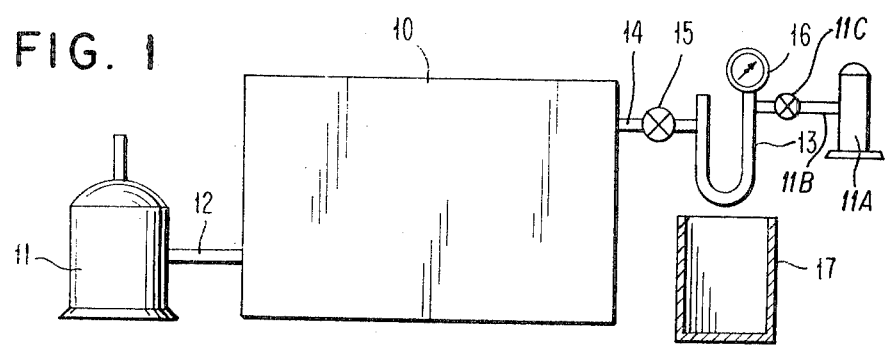
FIG. 1 is a diagrammatic representation of a high vacuum system equipped with a preferred leak detection apparatus of the invention.

In FIG. 1, system 10 which is to be operated under high vacuum is evacuated by vacuum pump 11 connected by tube 12 to system 10. The leak detection apparatus of this invention comprises U-tube 13 with one arm connected by tube 14 and valve 15 to system 10 and with th other arm connected to low pressure gauge 16, and container 17 which can fit around U-tube 13 and hold a cooling bath capable of chilling U-tube 13 to a temperature below about $-40°$ C. When the apparatus of the invention is to be used to locate a leak site in system 10 according to one form of the invention described hereinafter, a small second vacuum pump 11A is connected by tube 11B and valve 11C to U-tube 13. If this optional equipment is present, when the apparatus of FIG. 1 is used for leak detection in system 10, valve 11C is closed to isolate pump 11A.

During the start-up operation when vacuum pump 11 is activated to evacuate system 10, valve 15 is preferably left open. However, valve 15 may be in the closed position and opened when the desired pumpdown or evacuation of system 10 has been attained. In either case, with valve 15 open and pressure gauge 16 showing a substantially constant low reading, the first test for leakage is preferably carried out by the static method which requires that valve 15 be closed as the next step. Then container 17 holding a cooling bath is raised in order to immerse U-tube 13 in the cooling bath. Any reduction in the reading of gauge 16 corresponds to the removal of water vapor from the atmosphere in U-tube 13 by deposition as frost on the inner surface of U-tube 13. Any residual reading of gauge 16 after the elimination of water vapor is a measure of air remaining in U-tube 13 and, unless that residual pressure reading is insignificant, the air remaining in U-tube 13 indicates that vacuum system 10 is leaking.

Even the first test for leakage can be carried out by the dynamic method after the evacuation of system 10 has achieved a steady minimum reading of pressure gauge 16. To do so, valve 15 is kept open and container 17 holding a cooling bath is lifted to immerse U-tube 13 in the cooling bath and thus freeze any water vapor flowing into U-tube 13 from system 10. If gauge 16 shows a pressure loss greater than about 100 microns of Hg because of the conversion of water vapor to ice, any significant residual pressure reading may not be a reliable indication of leakage in system 10. As previously explained, a high flow of water vapor from system 10 into chilled U-tube 13 tends to entrain air and cause a build-up of air in U-tube 13 to give a higher pressure reading for air than it should be. Hence, a negligible amount of air in the presence of an appreciable amount of water vapor in system 10 may produce a reading at pressure gauge 16 that is a false indication of leakage in system 10. However, the dynamic method of checking for leakage is reliable if gauge 16 shows a pressure loss less than about 100 microns of Hg when U-tube 13 is immersed in the cooling bath of container 17. Under such circumstances, the dynamic method is ideal for continuously monitoring vacuum system 10 for any leakage that may develop during an extended period of operation. Of course, the static method may also be used intermittently to check system 10 for leaks during prolonged operation but this obviously involves manipulation by a technician.

Figure 2:
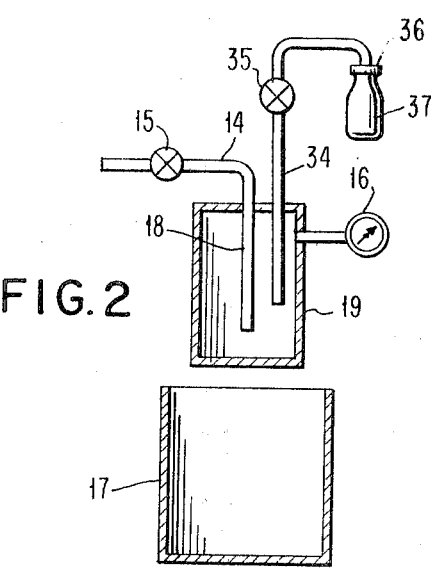
FIG. 2 to FIG. 5 show alternative forms of the leak detection apparatus.

FIG. 2 shows tube 14 with valve 15 connected to dip tube 18 which extends down into moisture trap vessel 19. Pressure gauge 16 is connected to vessel 19 and container 17 which is used to hold a cooling bath serves the purpose already explained in connection with FIG. 1. The leak detection apparatus of FIG. 2 is equivalent to that of FIG. 1 in that vessel 19 with dip tube 18 has the same function of U-tube 13.

Figure 3:
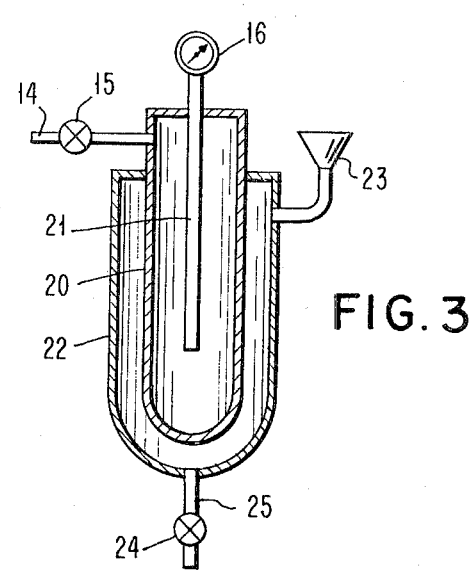

In FIG. 3, tube 14 with valve 15 discharges into trap vessel 20 into which dip tube 21 extends downwardly. Pressure gauge 16 is mounted on the exterior end of tube 21. In lieu of container 17, vessel 20 is surrounded by jacket 22 into which a cooling bath may be poured through funnel 23. The cooling bath may be withdrawn from jacket 22 by opening valve 24 in drain 25. Vessel 20 with tube 21 has the same role of vessel 19 with tube 18 of FIG. 2 even though the connections thereto of tube 14 and gauge 16 have been switched.

Figure 4:
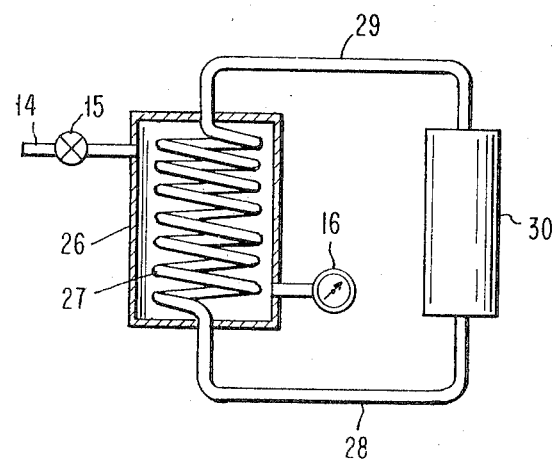

FIG. 4 shows pressure gauge 16 and tube 14 with valve 15 connected to vessel 26 through which refrigeration coil 27 passes. The opposite ends of coil 27 are connected by pipes 28 and 29 to refrigeration system 30. For any water vapor flowing into vessel 26, coil 27 provides its outer surface for the deposition of ice when refrigeration system 30 is activated to circulate refrigerant through coil 27. Hence, the refrigerant passing through the closed circuit of coil 27, pipes 28 and 29, and refrigeration system 30 replaces the cooling bath used in container 17 or jacket 22.

Figure 5:
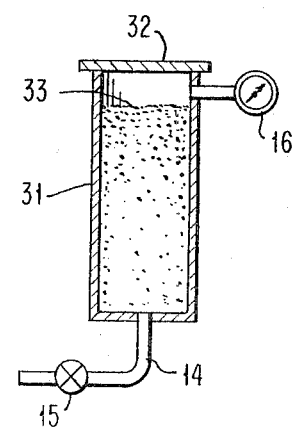

In FIG. 5, tube 14 with valve 15 enters the bottom of trap vessel 31 to which pressure gauge 16 is also connected. Vessel 31 is provided with sealable cap 32. Instead of capturing water vapor flowing from vacuum system 10 into vessel 31 by freezing as is done in FIG. 1 to FIG. 4, vessel 31 is filled with a solid adsorbent 33 in granular or pelleted form and closed by cap 32. If the test for leakage in system 10 is performed with adsorbent 33 already in vessel 31, only the dynamic method can be carried out. However, to use the static method of leak detection, a reading of gauge 16 is first taken with sealed vessel 31 empty and valve 15 open. Then, valve 15 is closed and moisture adsorbent 33 is placed in vessel 31. After again sealing vessel 31 with cap 32, valve 15 is opened and gauge 16 is again read. The difference between the two pressure readings is a measure of the water vapor in system 10 while the reading of gauge 16 after adsorbent 33 was introduced into vessel 31 is indicative of air in system 10.

In FIG. 1 and FIG. 2, container 17 with its cooling bath can be eliminated by placing adsorbent 33 in U-tube 13 and vessel 19, respectively. Thus modified, the apparatus of this invention in the forms illustrated by FIG. 1 and FIG. 2 can be operated in the same manner described for FIG. 5.

As previously mentioned, after an evacuated system has been determined pursuant to this invention to have some leakage, the location of such leakage can be established by using the apparatus of the invention.

Returning to FIG. 2, the location of the leak in the evacuated system is accomplished with the aid of water vapor introduced into trap vessel 19. For this purpose, vessel 19 is provided with tube 34 and valve 35, the exterior end of tube 34 being connected to sealable cap 36 of water bottle 37. With container 17 positioned to immerse vessel 19 therein and with valve 35 closed, liquid nitrogen is poured into container 17 to chill vessel 19. The reading of pressure gauge 16 will reflect the presence of leakage air in the evacuated system. Valve 35 is now opened and water vapor flows from water bottle 37 into vessel 19 where it deposits as an ice film with a temperature of approximately $-195°$ C. Leakage air in vessel 19 is cryotrapped by the very cold ice film and gauge 16 will show a reduced pressure reading. A jet of helium is then directed in sequence at joints and other places of the vacuum system considered as possible leakage sites until gauge 16 shows an increased pressure resulting from the helium drawn into the system through the thus located leak. Unlike air, helium is not captured by cryotrapping.

Trap vessels 20 of FIG. 3 and 26 of FIG. 4 may similarly be provided with tube 34, valve 35, cap 36 and water bottle 37 or equivalent means for introducing water vapor so that these forms of the apparatus of the invention can be used to locate the leaks of a vacuum system which has been determined pursuant to the invention to be leaky. Of course, to locate the leaks the temperature of vessel 20 and coil 27 would be reduced to approximately $-195°$ C. in order to effect the desired cryotrapping of leakage air.

Again referring to FIG. 2 and assuming that the leaky vacuum system has a pressure in excess of about 100 microns of Hg as read on gauge 16, the location of leakage is preferably conducted with carbon dioxide as the probe gas. In such case, instead of water bottle 37 with cap 36, a small vacuum pump is connected to tube 34. Valve 35 is then opened while the small vacuum pump is operated to suck leakage air from trap 19 which is chilled by immersion in container 17 holding liquid nitrogen. Inasmuch as leakage air enters trap 19 as fast as it is drawn therefrom by the small vacuum pump, gauge 16 shows no change in pressure. By spraying carbon dioxide on different parts of the vacuum system, gauge 16 will show a reduced pressure reading when the carbon dioxide jet strikes a leak site. The reduction in pressure occurs because the carbon dioxide sucked into the system through the leak displaces the air therein and flows into cold trap 19 wherein it is promptly condensed. When the carbon dioxide jet is stopped, leakage air again fills the system and trap 19 with the result that gauge 16 gives an increased pressure reading to confirm the location of the leak.

Of course, a small vacuum pump can similarly be connected to trap vessel 13 of FIG. 1 (see pump 11A), vessel 20 of FIG. 3 or vessel 26 of FIG. 4 to locate leakage in a vacuum system when carbon dioxide is used as probe gas.

When a trap containing a solid adsorbent has been used in accordance with this invention to establish that an evacuated system is suffering from leakage, that trap can be then used with helium as non-adsorbable probe gas to find the source of leakage. For such purpose, vessel 31 of FIG. 5 is chilled to a very low temperature, e.g., by immersion in liquid nitrogen, so that air in vessel 31 is adsorbed by chilled adsorbent 33 and gauge 16 shows a drop in pressure. A stream of helium is then directed in sequence at joints and other possible leaky parts of the evacuated system until gauge 16 shows a pressure increase and thus signals the location of a leak. Helium sucked into the system through the thus located leak flows into vessel 31 and creates the pressure increase because helium is not adsorbed by chilled adsorbent 33.

From the foregoing description it is clear that the apparatus of the invention for detecting leaks in vacuum systems requires only five elements: a trap vessel or chamber, a connection between said vessel or chamber and the vacuum system to be checked for leakage, a valve in said connection to control gas flow between said system and said vessel, a gauge to read the pressure in said vessel, and means for eliminating or trapping water vapor entering said vessel to an extent that the water vapor pressure therein is negligible. The means for capturing water vapor can be of the freezing type or of the adsorption type.

It is also clear that the apparatus of the invention can be further used to locate any leak in an evacuated system. When the apparatus includes means of the freezing type for capturing water vapor entering the trap vessel, means for introducing water vapor into the trap or for sucking air out of the trap are added to the apparatus so that it can be used to locate leaks in the vacuum system. When the apparatus includes means of the adsorption type for capturing water vapor entering the trap, means are provided for chilling the trap to a very low temperature so that the apparatus can be used to locate leaks in the vacuum system.

Those skilled in the art will visualize many variations and modifications of the invention, as illustrated by the foregoing disclosure, without departing from its spirit and scope. For instance, U-tube 13 of FIG. 1 may be replaced by a tubular coil and in FIG. 2 dip tube 18 may be eliminated by connecting tube 14 directly through any wall of vessel 19. Similarly, dip tube 21 in FIG. 3 may be omitted by mounting gauge 16 directly on vessel 20 or even on tube 14 between valve 15 and vessel 20. Accordingly, only such limitations should be imposed on the scope of the invention as are set forth in the appended claims.

What is claimed is:

1. Apparatus for leak detection in a vacuum system which comprises a moisture trap vessel, a tube connecting said vessel to said vacuum system, a valve in said tube, a sensitive low pressure gauge for measuring the pressure in said vessel, and means for capturing moisture entering said vessel so that the residual water vapor pressure therein is negligible.

2. The apparatus of claim 1 wherein the means for capturing moisture comprises a coolant in indirect heat exchange with moisture in the trap vessel to effect freezing of said moisture.

3. The apparatus of claim 2 wherein the coolant is a suspension of solid carbon dioxide in an organic liquid and said suspension is in contact with the exterior surface of the trap vessel.

4. The apparatus of claim 2 wherein the coolant is a refrigerant passed through a coil disposed in the trap vessel.

5. The apparatus of claim 1 wherein the means for capturing moisture comprises a moisture adsorbent disposed in the trap vessel.

6. The apparatus of claim 1 wherein the trap vessel is connected by a second tube and a second valve to a closed container of water so that when said second valve is opened water vapor flows from said container into said vessel.

7. The apparatus of claim 6 wherein the means for capturing moisture when the second valve is opened comprises liquid nitrogen in indirect heat exchange with moisture in the trap vessel to effect freezing of said moisture.

8. The apparatus of claim 1 wherein the trap vessel is connected by a second tube and a second valve to a vacuum source.

9. The apparatus of claim 1 wherein the trap vessel is a U-tube having one arm connected by the tube and valve to the vacuum system and the other arm connected to the low pressure gauge.

10. The apparatus of claim 9 wherein the means for capturing moisture comprises a suspension of solid carbon dioxide in an organic liquid, said suspension being in contact with the exterior surface of the U-tube.

11. The method of leak detection in a vacuum system which comprises providing fluid communication between said system and a chamber, capturing moisture in said chamber so that the residual water vapor pressure in said chamber is negligible, and measuring the pressure in said chamber to determine whether air is leaking into said system.

12. The method of claim 11 wherein the measurement of the pressure in the chamber is made before and after capturing moisture in said chamber.

13. The method of claim 12 wherein the fluid communication between the vacuum system and the chamber is stopped before capturing moisture in said chamber.

14. The method of claim 13 wherein the capture of moisture in the chamber is effected by freezing said moisture.

15. The method of claim 11 wherein the capture of moisture in the chamber is effected by a moisture adsorbent within said chamber.

16. The method of claim 11 wherein the capture of moisture in the chamber is effected by chilling said chamber to a temperature in the range of about $-120°$ to $-40°$ C.

17. The method of locating any leak in a vacuum system which comprises providing fluid comunication between said system and a moisture trap chamber, chilling said chamber to a temperature of about $-195°$ C., introducing water vapor from an external source into said chamber, measuring the pressure in said chamber, and thereafter directing a stream of helium in sequence to each part of said system which is a potential leak site and noting a pressure increase in said chamber caused when said stream is directed to a leaky part of said system.

18. The method of locating any leak in a vacuum system which comprises providing fluid communication between said system and a moisture trap chamber, chilling said chamber to a low temperature effective for the condensation of carbon dioxide therein, measuring the pressure in said chamber while suction is applied directly thereto in addition to the suction applied through said system, and thereafter directing a stream of carbon dioxide in sequence to each part of said system which is a potential leak site and noting a pressure decrease in said chamber caused when said stream is directed to a leaky part of said system.

19. The method of locating any leak in a vacuum system which comprises providing fluid communication between said system and a moisture trap chamber containing a solid moisture adsorbent, chilling said chamber and said adsorbent to a temperature of about $-195°$ C., measuring the pressure in said chamber, and thereafter directing a stream of helium in sequence to each part of said system which is a potential leak site and noting a pressure increase in said chamber caused when said stream is directed to a leaky part of said system.

* * * * *

UNITED STATES PATENT OFFICE
CERTIFICATE OF CORRECTION

PATENT NO. : 4,409,817
DATED : Oct. 18, 1983
INVENTOR(S) : David Edwards, Jr.

It is certified that error appears in the above-identified patent and that said Letters Patent are hereby corrected as shown below:

Column 1, second line, after "Energy." insert

--The Government has rights in this invention pursuant to Contract No. DE-AC02-76-CH00016 awarded by the United States Department of Energy.--.

Signed and Sealed this

Seventh Day of February 1984

[SEAL]

Attest:

GERALD J. MOSSINGHOFF

Attesting Officer

Commissioner of Patents and Trademarks